United States Patent [19]

Triffaux et al.

[11] Patent Number: 5,109,765

[45] Date of Patent: May 5, 1992

[54] DEVICE FOR ASSEMBLING LAMINATED GLAZINGS

[75] Inventors: Francis Triffaux, Thourotte; Michel Moncheaux, Compiegne, both of France

[73] Assignee: Saint-Gobain Vitrage, Courbevoie, France

[21] Appl. No.: 708,840

[22] Filed: May 30, 1991

Related U.S. Application Data

[63] Continuation of Ser. No. 377,952, Jul. 11, 1989, abandoned.

[30] Foreign Application Priority Data

Jul. 12, 1988 [FR] France ................... 88 09498

[51] Int. Cl.⁵ .................................. B30B 3/04
[52] U.S. Cl. .......................... 100/155 G; 100/156; 100/168; 100/171; 156/582
[58] Field of Search ............... 100/155 G, 162 B, 168, 100/169, 100, 156, 171; 156/582

[56] References Cited

U.S. PATENT DOCUMENTS

| | | | |
|---|---|---|---|
| 2,983,635 | 5/1961 | Richardson | 100/155 G X |
| 3,054,344 | 9/1962 | Boicey et al. | 100/155 G X |
| 3,669,808 | 6/1972 | Klotzbach et al. | 100/155 G X |
| 4,327,634 | 5/1982 | Colmon et al. | 100/155 G |
| 4,696,713 | 9/1987 | Okafuji et al. | 100/155 G X |

FOREIGN PATENT DOCUMENTS

2202771 7/1973 Fed. Rep. of Germany.
2053104 4/1971 France.

Primary Examiner—Harvey C. Hornsby
Assistant Examiner—Stephen F. Gerrity
Attorney, Agent, or Firm—Oblon, Spivak, McClelland, Maier & Neustadt

[57] ABSTRACT

The device according to the invention includes at least one assembly of pressing rollers divided into at least two subassemblies of pressing rollers. Each subassembly of pressing rollers is mounted on a beam portion the position of which can be changed and adjusted in relation to the position of the other beam portions.

6 Claims, 6 Drawing Sheets

DEVICE FOR ASSEMBLING LAMINATED GLAZINGS

This application is a continuation of application Ser. No. 07/377,952, filed on Jul. 11, 1989, now abandoned.

FIELD OF THE INVENTION

This invention relates to the production of laminated glazings and, in particular, to a device for assembling the constitutive elements of a laminated glazing by a pressing by calendering—i.e., by passing of the laminated glazings between upper and lower pressing means.

BACKGROUND OF THE INVENTION

The known calendering devices (described, for example, in French Patent No. 2,053,104) are generally equipped with two series of pressing rollers: one series of lower rollers placed beside one another, their position being able to be adjusted independently so as to obtain a curvature corresponding to the desired crosswise curvature (which is generally the average curvature of the glazing), and a series of upper rollers placed approximately in the same way. In the known devices, the two series of rollers are each mounted on a cross beam belonging to a frame that can pivot around a horizontal axis, the assembly constituting a mobile unit, so that the rollers remain approximately perpendicular to the glazing during the entire assembly operation. Adjustment of the position of the pressing rollers can be performed by means of their mounting system on the cross beam. This adjustment is delicate and time consuming because these devices are equipped with a large number of pressing rollers—generally between 30 and 40. These rollers must be adjusted in height and inclination, individually or by pairs in relation to one another.

These devices are generally suitable for the assembling of double-bend glazings when the double-bend is not very accentuated and when the crosswise bend of the glazing is even and approximately the same over the entire length of the glazing. However, for glazings with more complex shapes, particularly glazings exhibiting a very deep bend in the cross section and/or an uneven bend over the length of the glazing, these known devices are not satisfactory, either because they do not provide sufficient or homogeneous adhesion or because they cause the glazing to break.

SUMMARY OF THE INVENTION

The invention proposes a device for assembling symmetric or asymmetric laminated glazings by pressing, able to be performed both on slightly accentuated and even double-bend glazings and on glazings with complex shapes that can exhibit very accentuated and/or uneven bends. By symmetrical laminated glazings is meant, according to the invention, laminated glazings the two faces of which consist of glass sheets. By asymmetric laminated glazings is meant laminated glazings formed with a laminated or monolythic rigid support and a flexible sheet of plastic having the desired properties—for example, the asymmetric glazings described in French Patent No. 2,398,606 and in European Patent Nos. 0,132,198 and 0,131,523.

The device according to the invention comprises at least one assembly of pressing means extending crosswise, divided into subassemblies of pressing means, each subassembly being mounted on a beam portion the position of which can be oriented with respect to the vertical independently of the other beams. By pressing means is meant the rollers and their elastic or pneumatic mounting systems on the beam to which they are attached.

The number of subassemblies of an assembly of pressing means is at least equal to two. This number can vary depending on the purpose of the device.

Under one aspect of the invention, the beam portions each carrying a subassembly of pressing means are jointed to one another, and at least one of the beam portions held by a horizontal cross beam that is, like the assembly of pressing means, a part of a mobile unit. The beam portions can be adjusted to the desired position in relation to the horizontal cross beam, either using bolts, racks, or other mechanical systems, or using pneumatic cylinders, for example. The end beam portions can also be mounted on joints carried by the lateral uprights of the mobile unit. The adjustment of the orientation of the beam portions can be made as a function of the glazing model or controlled by a robot having the shape of the glazing in memory.

When the device according to the invention is a calenderer comprising an assembly of upper rollers and an assembly of lower rollers, the division into subassemblies can be made for the assembly of upper rollers or for the assembly of lower rollers or else for both of them.

In a variant, the device according to the invention comprises as lower pressing means an assembly of lower pressing rollers divided into subassemblies and as upper pressing means a flexible cylindrical pressing roller that extends over the entire useful width of the device. The desired curvature of the pressing roller is provided by the support action of at least one series of upper rollers—as described, for example, in European Patent No. 0,015,209.

In a variant, the pressing device according to the invention comprises as upper pressing means an assembly of upper pressing rollers divided according to the invention into subassemblies of rollers and as lower pressing means a form support suited to the geometry of the glazing. The form support is able to be mounted to rock around one or more horizontal pins. A pressing device using a form support is described in French Patent Application No. 87/15,624. In this variant, the mobile unit is formed by the assembly of upper pressing rollers, and it is equipped with means making it possible to move in the direction perpendicular to the upper pressing assembly.

As previous described, a pressing assembly can be divided into two, three, or more subassemblies.

In an embodiment where an assembly is divided into three subassemblies (i.e., comprising three beams carrying pressing rollers), the three subassemblies can be placed in a symmetrical fashion. The three beam portions can also be placed in an asymmetrical fashion. This latter variant can be preferred when the device is provided for the assembling of glazings the crosswise curvature of which is complex.

The number of pressing rollers belonging to each subassembly can vary from one subassembly to the next.

DETAILED DESCRIPTION OF THE PRESENTLY PREFERRED EMBODIMENTS

The First Embodiment

Figure 2:
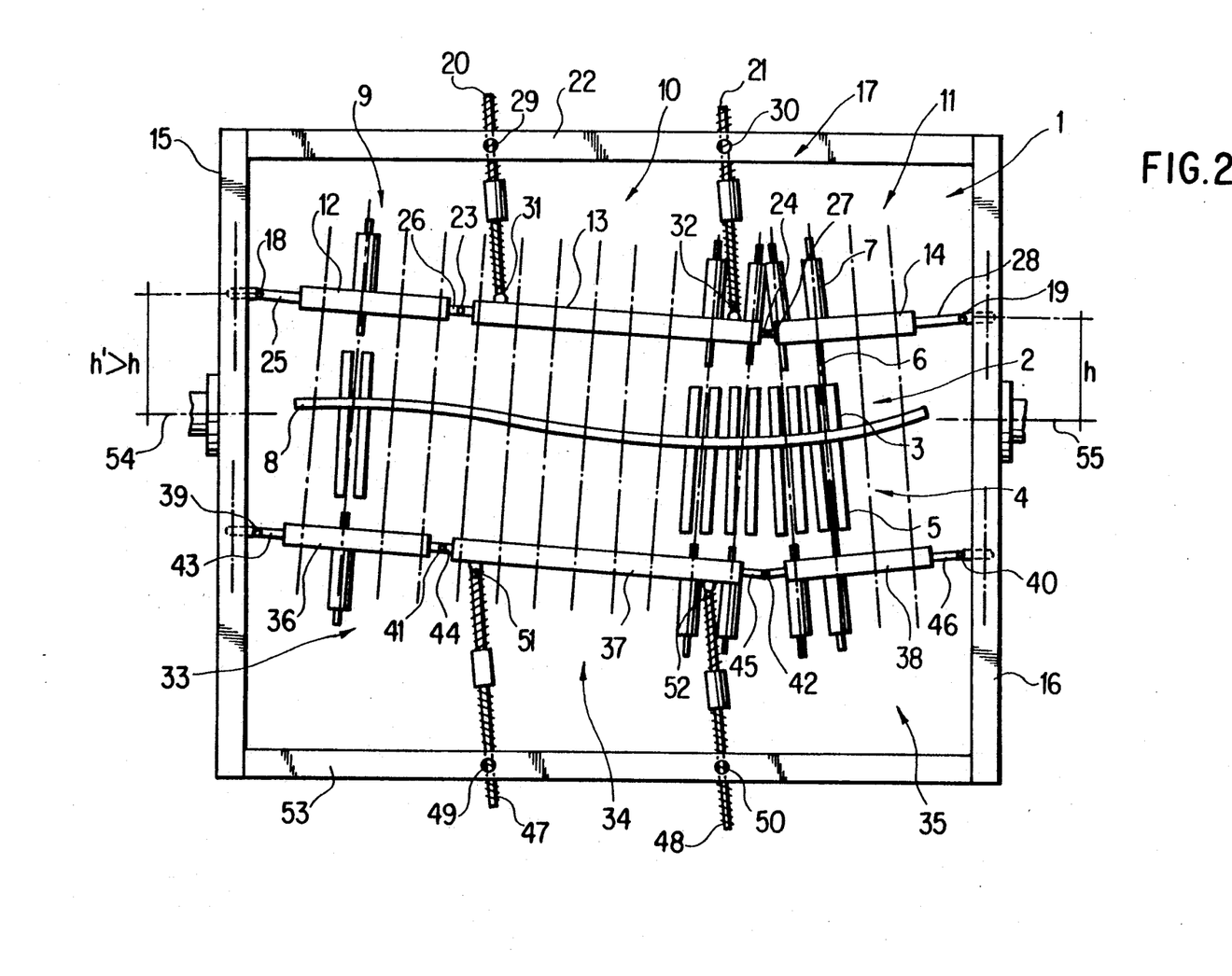
FIG. 2 is a diagrammatical representation in elevation of an embodiment comprising an upper assembly of pressing means and a lower assembly of pressing means divided into subassemblies. This device can be used for the assembling by pressing of laminated glazings the two outside faces of which are made of rigid sheets, such as glass sheets. In this figure, the upper and lower assemblies of pressing means are placed so as to press a glazing B in the direction of passage indicated by the arrow in FIG. 1B.

The device shown in FIG. 2 comprises a mobile unit 1 equipped with an assembly 2 of upper pressing rollers 3 and an assembly 4 of lower pressing rollers 5 (all the rollers are not represented). Each roller 3, 5 is mounted in pairs at the end of a rod 6 that is part of an elastic adjustment assembly 7 that makes it possible to adjust the positioning of rollers 3, 5 according to the desired curvature for the pressing line for a glazing 8 to be pressed. The upper pressing rollers 3 and the lower pressing rollers 5 are applied to the glazing 8 by elastic systems (not shown) that are part of the adjustment assembly 7. The upper pressing rollers 3 and their adjustment assembly 7 are divided into three subassemblies 9, 10, 11, each carried by a corresponding beam portion 12, 13, 14, the beam portions forming a beam. Each of the two end beam portions 12 and 14 is mounted via a corresponding joint 18, 19 on a corresponding vertical upright 15, 16 of a frame 17 that belongs to the mobile unit 1. The position of the joints 18, 19 is adjustable along the vertical uprights 15, 16. Each end of the central beam portion 13 is connected to the adjacent end of one of the beam portions 12, 14 by a corresponding joint 23, 24. Each of the joints 18, 19, 23, 24 is mounted on a corresponding sliding system 25, 26, 27, 28 that fits on the ends of the associated beam 12, 13, 14. The central beam portion 3 is supported by two bolt systems 20, 21 and by a horizontal cross beam 22 connecting the two vertical uprights 15, 16 to form the frame 17. Each bolt system 20, 21 can pivot around a corresponding horizontal pin 29, 30 that passes through the horizontal cross beam 22 and around a corresponding pin 31, 32 on the central beam 13.

The lower pressing rollers 5 and their adjustment assembly 7 are in the same way divided into three subassemblies 33, 34, 35 each carried by a corresponding beam portion 36, 37, 38. Each of the two end beam portions 36, 38 is mounted via a corresponding joint 39, 40 to the corresponding vertical upright 15, 16 of the frame 17 that belongs to the mobile unit 1. The position of the joints 39, 40 is adjustable along the vertical uprights 15, 16. Each end of the central beam portion 37 is connected to the adjacent end of one of the beam portions 36, 38 by a corresponding joint 41, 42. Each of the joints 39, 40, 41, 42 is mounted on a corresponding sliding system 43, 44, 4.5, 46 that fits on the end of the associated beam portions 36, 37, 38. The central beam portion 37 is supported by two bolt systems 47, 48 and by a horizontal cross beam 53 connecting the two vertical uprights 15, 16 to form the frame 17. Each bolt system 47, 48 can pivot around a corresponding horizontal pin 49, 50 that passes through the horizontal cross beam 53 and around a corresponding beam 51, 52 on the central beam portion 37.

The assembly 4 of lower pressing rollers 5 comprises at least two driving rollers connected by a transmission system (not shown) to an electric motor (not shown).

The frame 17 and the mobile unit 1 are mounted to pivot around two horizontal, aligned pins 54, 55 that are fitted on one side into the two vertical uprights 15, 16 and carried on the other side by bearings belonging to the frame of the device (not shown).

Figure 1A:
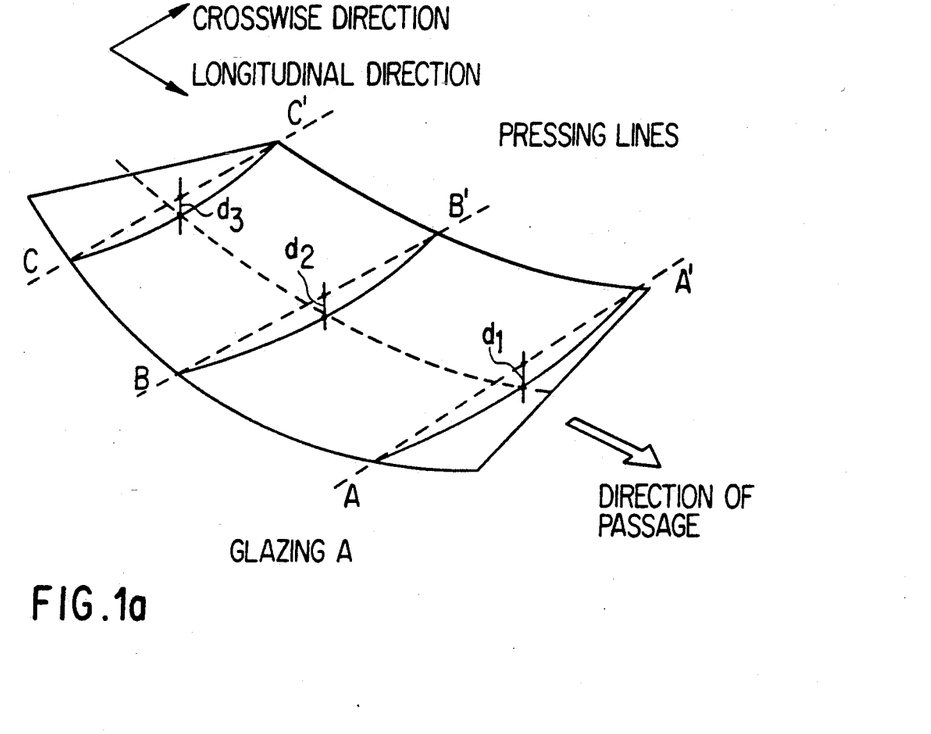
FIG. 1A is a representation in perspective of a type of laminated glazing (called hereafter "glazing A") of nondevelopable shape, which exhibits a bend in the crosswise direction that is approximately symmetrical in relation to the median longitudinal axis.
Figure 1B:
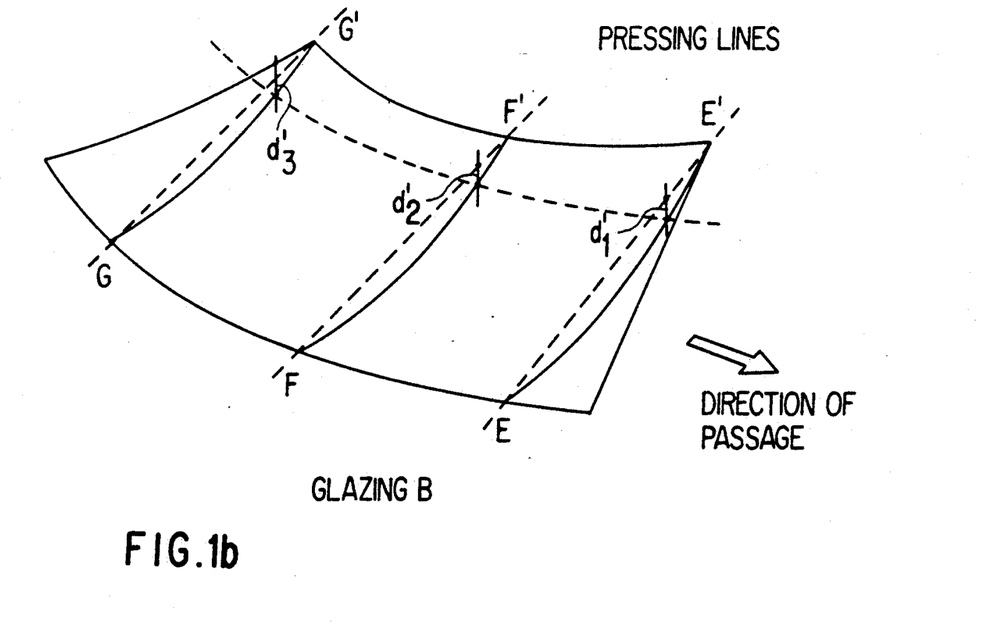
FIG. 1B is a representation in perspective of another type of laminated glazing (called hereafter "glazing B") of nondevelopable shape, which exhibits a bend in the crosswise direction that is much more accentuated on one side of the median longitudinal axis than the other.

The above device makes possible particularly the assembling of plane or bent laminated glazings. The bent glazings can exhibit, as represented in FIGS. 1A and 1B, a bend in the crosswise direction, accentuated symmetrically or not in relation to the median longitudinal axis of the glazing. To go from one type of glazing to another (for example, to go from the pressing of a glazing exhibiting a certain crosswise bend to the pressing of a glazing exhibiting a very different crosswise bend—for example, from glazing A to glazing B), it is enough to change the arrangement of the upper subassemblies 9, 10, 11 and the lower subassemblies 33, 34, 35 without changing the arrangement of the adjustment assembly 7 in relation to one another or in relation to the beam on which each adjustment assembly 7 is mounted.

The device operates as follows: the two upper and lower pressing subassemblies are placed according to a general shape close to that of the glazing to be pressed—for example, in the shape of a U if a type B glazing must be pressed or in an aligned and horizontal way if a plane glazing must be pressed. The upper pressing subassemblies 9, 10, 11 must be placed parallel to the lower pressing subassemblies 33, 34, 35 and at such a distance from one another that, on the one hand, the glazing 8 to be pressed is located approximately at the level of the horizontal pins 54, 55 of the mobile unit 1 and, on the other hand, the upper pressing rollers 3 and the lower pressing rollers 5 rest on the glazing 8 with the desired pressure. This arrangement is obtained easily by acting on the bolt systems 20, 21, 47, 48, which determine the distance in relation to the horizontal cross beams 22 and 53 of the central beam portions 13 and 37, respectively, and, optionally, by changing the distance between the joints 18, 39 and/or the joints 19, 40, located at the ends, in relation to the horizontal pins 54 and 55. Thus, by acting on the bolt systems and optionally changing the distance between the joints, each of the beam portions can be oriented with respect to the vertical independently of the other beam portions. In addition, to keep the upper pressing rollers 3 and the lower pressing rollers 5 face to face and at the desired distance from one another, the sliding system 25, 26, 27, 28 on the one hand, and the sliding systems 43, 44, 45, 46, on the other hand, can be acted upon to bring together or to separate the beam portions 12, 13, 14 and 36, 37, 38, respectively, from one another.

Figure 3A:
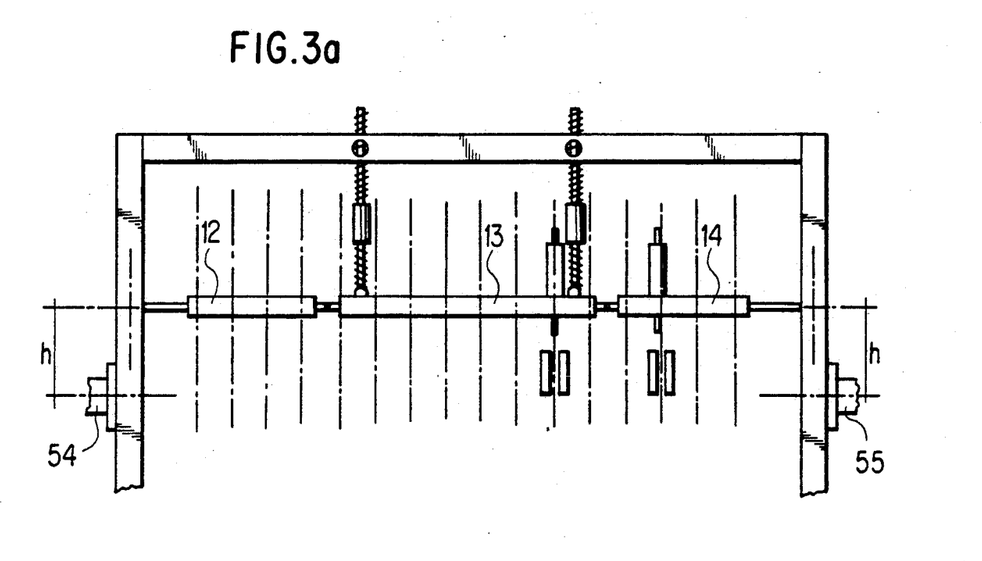
FIG. 3A is a diagrammatical representation of the upper part of the device represented in FIG. 2, but in another adjustment configuration. The pressing means are placed so as to press a plane laminated glazing.
Figure 3B:
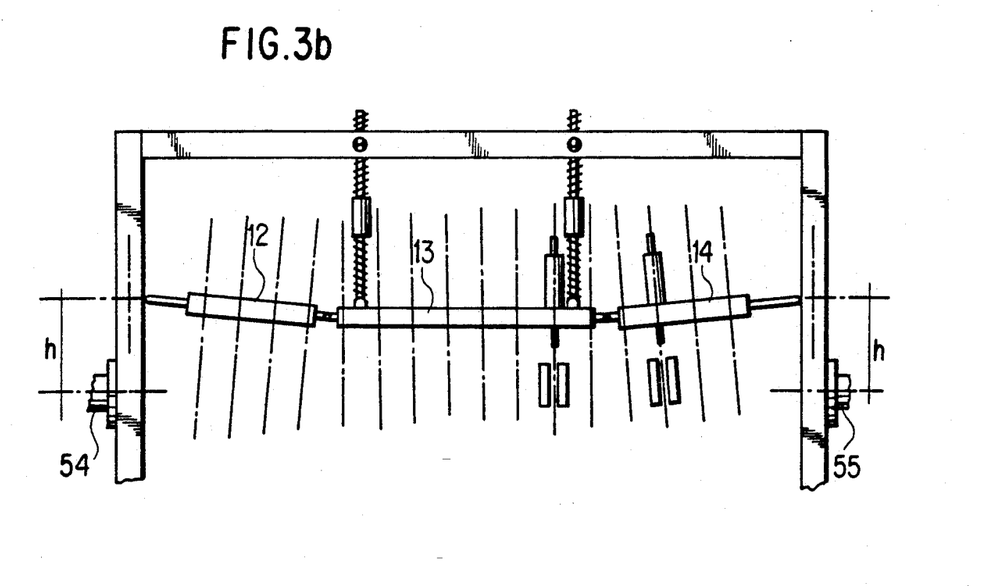
FIG. 3B is a diagrammatic representation of the upper part of the device represented in FIG. 2 but in another adjustment configuration. The pressing means are placed so as to press a glazing A in the direction of passage indicated by the arrow in FIG. 1A.

FIG. 2 and FIGS. 3A and 3B show three examples of possible adjustments on this device. The device represented in FIG. 2 is shown adjusted for a glazing B. The beams 12, 13 and 36, 37 are respectively aligned. The beams 14 and 38 are inclined about 10° in relation to the preceding ones, and the joint 18 is positioned at a distance h' from the horizontal pin 54 that is slightly greater than the distance h separating the joint 19 and the horizontal pin 55. The glazing 8 is correctly pressed because all the pressing rollers are suitably inclined in relation to the glazing.

The same device is shown in FIG. 3A in adjusted position for a plane glazing. All the beams are placed horizontally.

The same device is shown in FIG. 3B in adjusted position for a glazing A. The central beam 13 is placed horizontally, and the end beams 12, 14 are inclined about 6° in relation to the central beam 13.

The Second Embodiment

Figure 4:
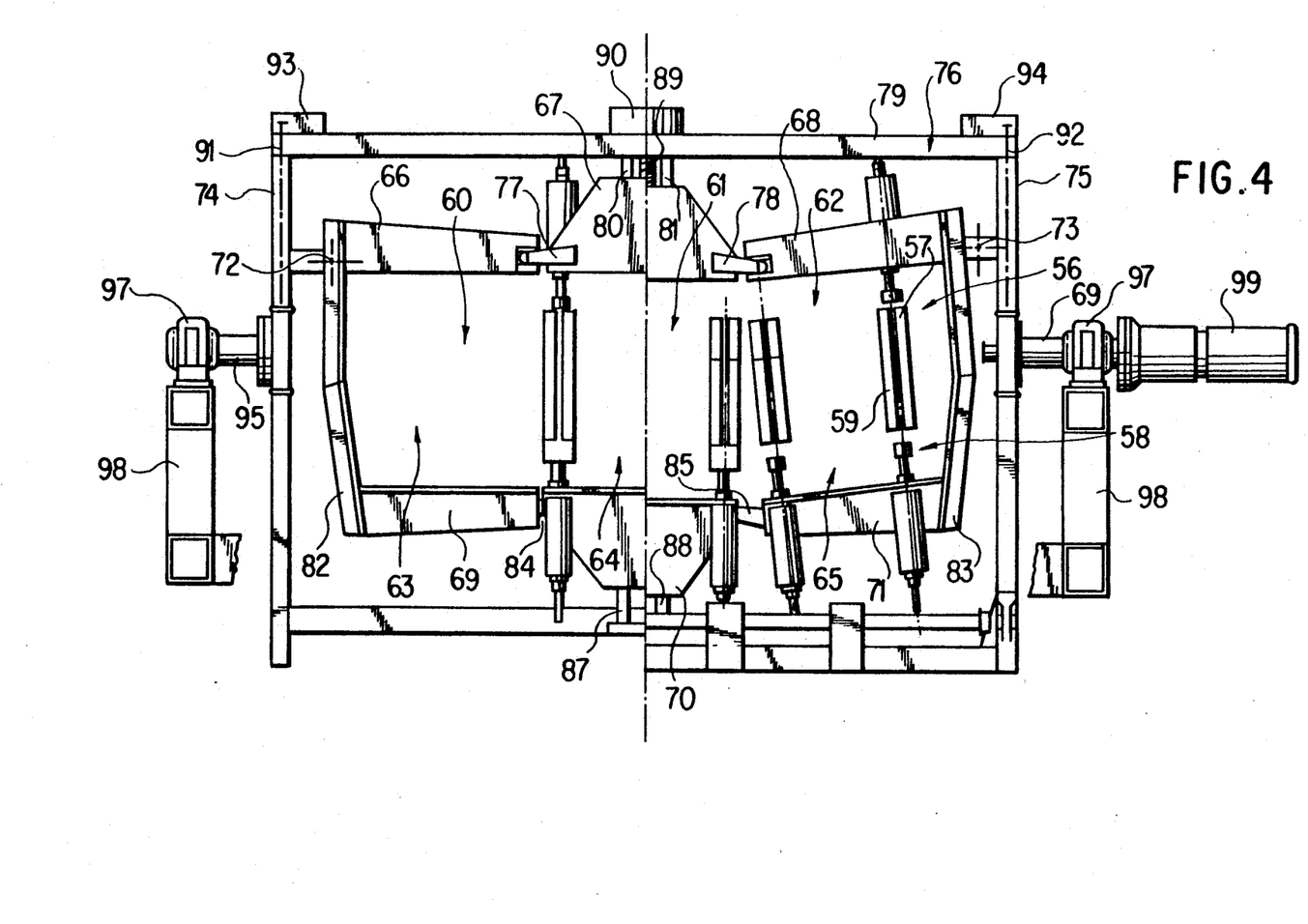
FIG. 4 is a representation in elevation of an embodiment in which the upper assembly of pressing means and the lower assembly of pressing means are each divided into three subassemblies, the two end subassemblies being able to be mounted symmetrically or asymmetrically.

The device shown in FIG. 4 is equipped with an upper assembly 56 of pressing rollers 57 (all the rollers are not shown) divided into three subassemblies 60, 61, 62 and with a lower assembly 58 of pressing rollers 59 divided into three subassemblies 63, 64, 65. Each subassembly is carried by a corresponding beam portion 66, 67, 68, 69, 70, 71.

Each of the two upper end beam portions 66, 68 is pivoted around a corresponding horizontal pins 72, 73 which itself is mounted in an adjustable way on a corresponding upright 74, 75 of a frame 76. Each one of the two upper end beam portions 66, 68 is also connected by a corresponding joints 77, 78 to the upper central beam 67.

The upper central beam portion 67 is supported in an adjustable way by an upper crossbeam 79 connecting the two uprights 74, 75 of the frame 76. The central beam portion 67 is mounted to slide along two vertical columns 80, 81 supported by the upper crossbeam 79. This mounting allows a vertical travel from the upper central beam portion 67, which remains horizontal.

The two upper end beam portions 66, 68 are solid with the two lower end beam portions 69, 71 so that the two end beams 66, 69 located on the same side of the device form a U 82 and so that the two other beam portions 68, 71 located on the other side of the device form a U 83.

The two lower end beam portions 69, 71 are—in the same way as the upper end beam portions 66, 68—connected by joints 84, 85 to the lower central beam 70. This lower central beam portion 70 is connected in an adjustable way to a lower crossbeam 86 that belongs to the mobile frame. The lower central beam portion 70 is also mounted to slide along two vertical columns 87, 88 carried by the lower crossbeam 86.

The position of the upper central beam 67 in relation to the upper crossbeam 79 is given by an endless screw 89 controlled by a motorized system 90.

In the same way, the position of each of the two hinge pins 72, 73 in relation to the upper crossbeam 79 is given by a corresponding endless screw 91, 92 each of which is controlled by a corresponding motorized system 93, 94 mounted on the upper crossbeam 79.

By the selection of the clearance of the various systems for guiding between beam portions and for vertical travel for the central beams, a symmetrical arrangement for the beams or an asymmetrical arrangement can be obtained.

The mobile frame is mounted to pivot on a horizontal pin 95 and a horizontal pin 96 each of which is connected to a corresponding one of the two uprights 74, 75 of the frame. Each of the horizontal pins 95, 96 is carried by a corresponding bearing 97 mounted on a corresponding vertical column 98.

The lower assembly 58 of pressing rollers 59 comprises at least two driving rollers connected by a transmission system (not shown) to an electric motor 99.

The device shown in FIG. 4 can be controlled by a robot having the shape of the glazing in memory. The robot controls the motorized systems 90, 93, 94, which respectively control the position of the upper central beam 67 and the horizontal pins 72 and 7 in relation to the upper crossbeam 79.

The device operates as follows. In the case of a glazing of not very complex shape (for example, a glazing A the crosswise bend of which is even and approximately the same over the entire length of the glazing—i.e., in FIG. 1A, d1, d2, and d3 have approximately the same value), the robot determines and adjusts the appropriate position (orientation with respect to vertical) of the central beam 67 and of the horizontal pins 72 and 73 on the basis of the median curvature of the glazing, so that the pressing rollers 57 and 59 are correctly oriented in relation to the plane of the glazing and so that the glazing remains approximately at the level of the pivot pin of the mobile frame 76. In this way, glazings exhibiting accentuated, but even, bends can be correctly pressed. Naturally, glazings B, slightly bent glazings, or even plane glazings can also be pressed in the same way.

In the case of a glazing of very complex shape, which exhibits crosswise bend values that are very variable over the length of the glazing (for example, a glazing A that is very hollow in the head zones and flatter in the central zone—FIG. 1A), the robot determines and adjusts, zone by zone, indeed section by section, the position (orientation) of the horizontal pins 72, 73 and/or of the central beam 67 as the glazing advances between the pressing rollers.

In this case, the robot has the shape of the glazing in memory or uses readings of bend depths made on the glazing prior to pressing—for example with suitable sensors.

Third Embodiment

Figure 5:
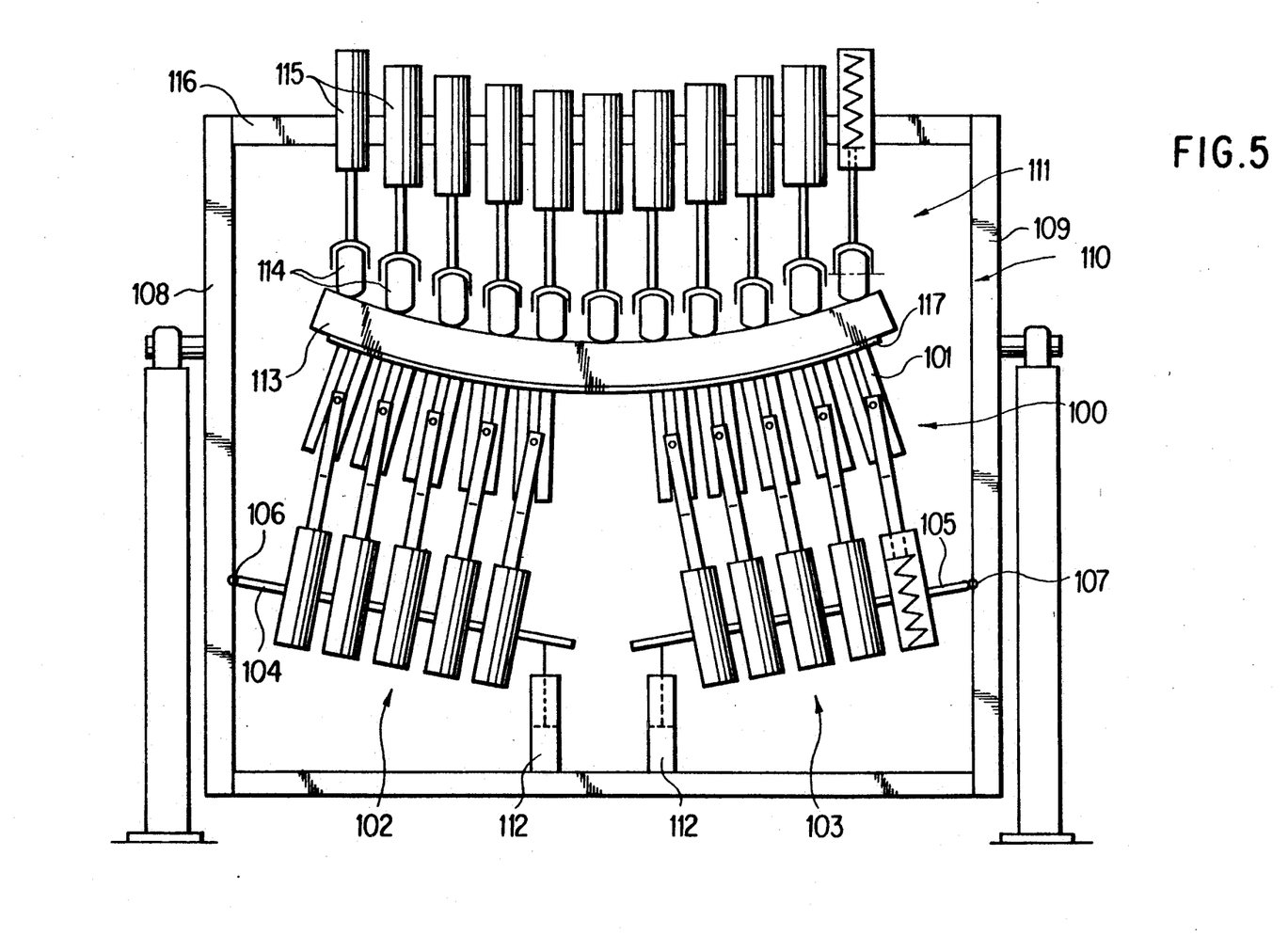
FIG. 5 is a diagrammatic representation in elevation of an embodiment comprising a lower assembly of pressing means divided into subassemblies and a flexible upper pressing roller.

The device shown in FIG. 5 comprises a lower assembly 100 of pressing rollers 101 divided into two subassemblies 102, 103. Each subassembly 102, 103 is carried by a corresponding beam portion 104, 105 that is pivoted around a corresponding horizontal pin 106, 107 carried by a corresponding upright 108, 109 of a pivoting frame 110 of a mobile unit 111 and supported by the rod of a corresponding cylinder 112. The upper pressing means here consists of a flexible pressing roller 113 that extends over the entire width of the device and that is bent under the action of a plurality of upper rollers 114 the position of each of which is adjusted by a corresponding mounting assemblies 115 carried by an upper crossbeam 116 connecting the two uprights 108, 109 of the pivoting frame 110. Support rollers (not shown) can be applied upstream and downstream from the flexible pressing roller 113 to prevent it from escaping the action of the upper rollers 114.

This device can be used for the assembling by calendering of a glazing 117 made of a rigid support and a sheet of flexible plastic, for example.

The Fourth Embodiment

Figure 6:
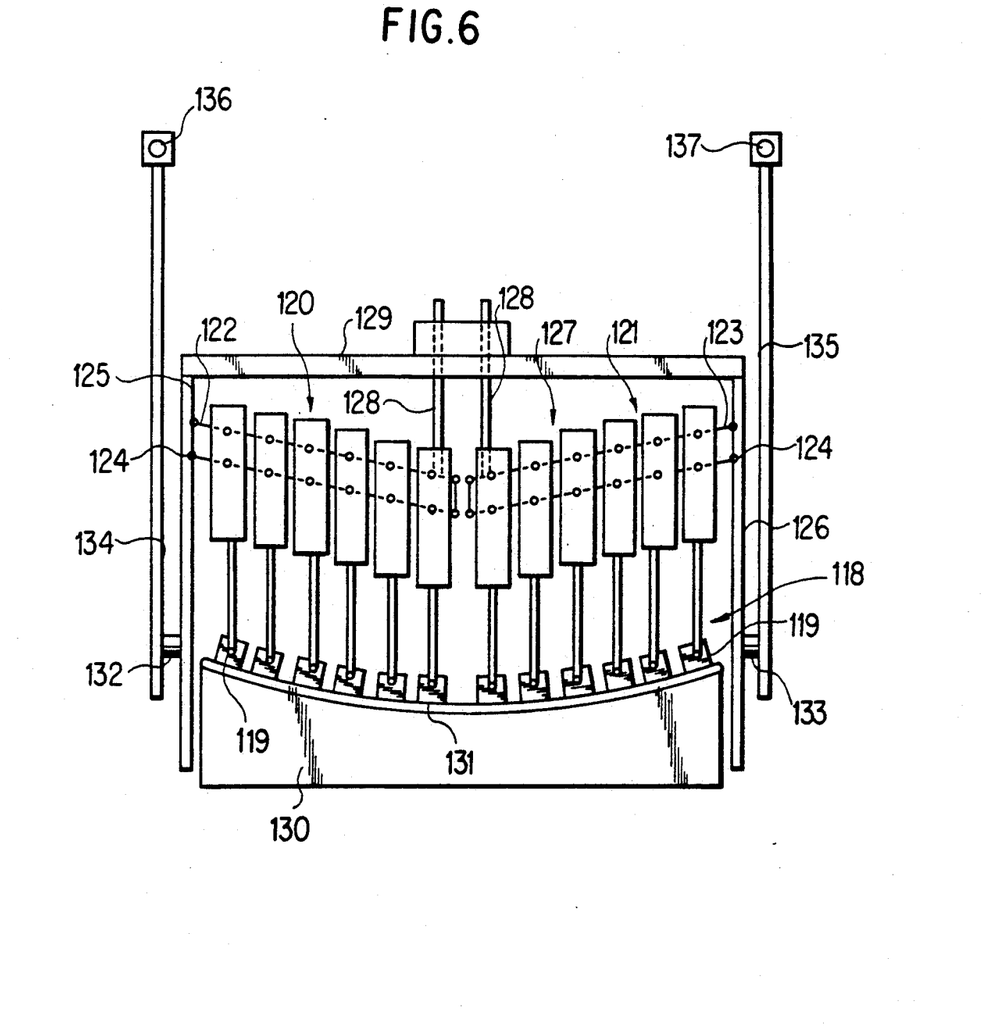
FIG. 6 is a diagrammatical representation in elevation of an embodiment comprising an upper assembly of pressing means divided into subassemblies and a form support as lower pressing means.

The device shown diagrammatically in FIG. 6 comprises an assembly 118 of upper pressing rollers 119 divided into two subassemblies 120, 121 each of which is mounted on a corresponding beam portion 122, 123. Each of the beam portions 122, 123 is pivoted around a corresponding horizontal pin 124 carried by a corresponding vertical upright 125, 126 of a mobile unit 127. Each of the beam portions 122, 123 is also supported by a corresponding adjustment bolt 128 mounted on an upper crossbeam 129 connecting the two vertical uprights 125, 126. The lower part of the device is formed by a support (means for opposing) 130 which assumes the shape of a glazing 131 to be assembled. Each of the two vertical uprights 125, 126 can pivot around a corresponding horizontal pin 132, 133, and each of the horizontal pins 132, 133 is carried by a corresponding arm 134, 135. Each of the arms 134, 135 is mounted to slide in a horizontal movement along a corresponding horizontal rail 136, 137 that extends perpendicularly to the assembly 118 of upper pressing rollers 119.

Obviously, numerous modifications and variations of the present invention are possible in light of the above teachings. It is therefore to be understood that, within the scope of the appended claims, the invention may be practiced otherwise than as specifically described herein.

What is new and desired to be secured by Letters Patent of the United States is:

1. A device for assembling a laminate glazing by pressing, said device including a mobile unit comprising:
    upper and lower horizontal crossbars, and first and second vertical uprights, which together comprise a pivotal frame;
    at least one beam mounted between said vertical uprights, said at least one beam comprising at least two beam portions mounted such that each of said beam portions can be oriented with respect to the vertical independently of an other beam portion of said at least one beam;
    means for separately adjusting the vertical orientation of each of said beam portions;
    an elastic adjustment assembly mounted to each of said beam portions;
    at least one pressing roller mounted to each of said beam portions via a respective one of said elastic adjustment assemblies; and
    means for opposing each of said at least one pressing rollers such that a laminate glazing may be pressed between said pressing rollers and said means for opposing.

2. The device of claim 1 wherein said at least one beam comprises three beam portions articulated to one another, including end beam portions mounted to said vertical uprights.

3. The device of claim 2 wherein said means for separately adjusting comprise threaded bolts connected between said frame and a middle one of said beam portions and means for adjusting a mounting position of said end beam portions to said vertical uprights.

4. The device of claim 1, wherein said at least one beam comprises upper and lower beams, and wherein end beam portions of said upper and lower beams are connected to one another.

5. The device of claim 1 wherein said means for opposing comprises a form support.

6. The device of claim 1 wherein said pressing rollers are lower rollers and said means for opposing are upper rollers and a flexible roller bent under the action of the upper rollers.

* * * * *